Feb. 12, 1957  E. R. KROLL ET AL  2,780,903
PLATFORM ADJUSTING MEANS FOR SIDEHILL HARVESTERS
Filed Dec. 22, 1952  4 Sheets-Sheet 1

INVENTORS
EVERETT R. KROLL &
FRANK FARBER
BY
ATTORNEYS

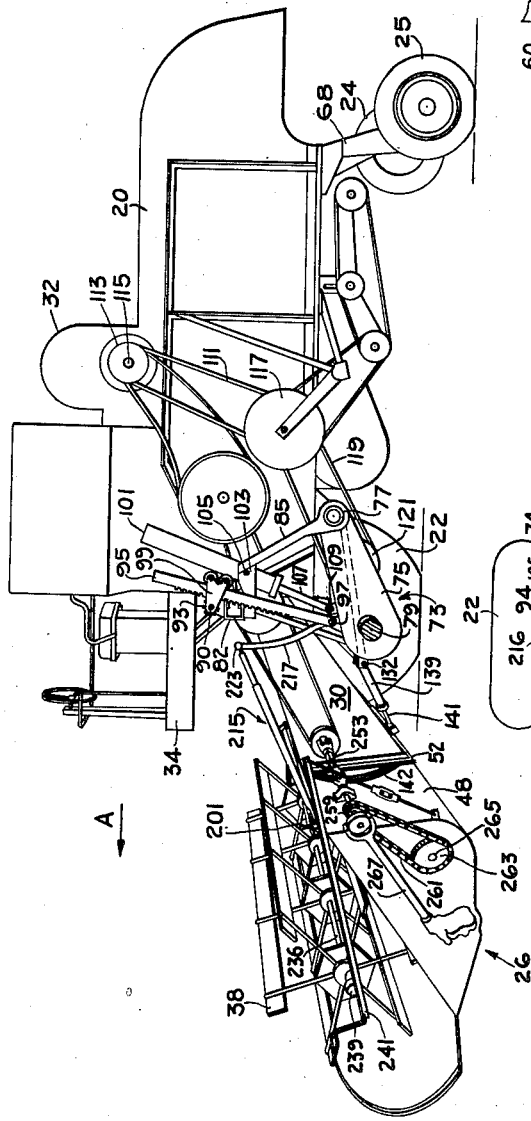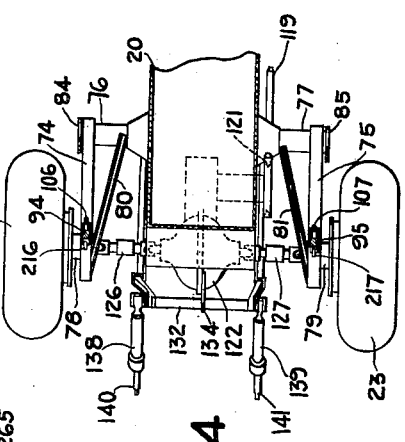

Feb. 12, 1957 E. R. KROLL ET AL 2,780,903
PLATFORM ADJUSTING MEANS FOR SIDEHILL HARVESTERS
Filed Dec. 22, 1952 4 Sheets-Sheet 3
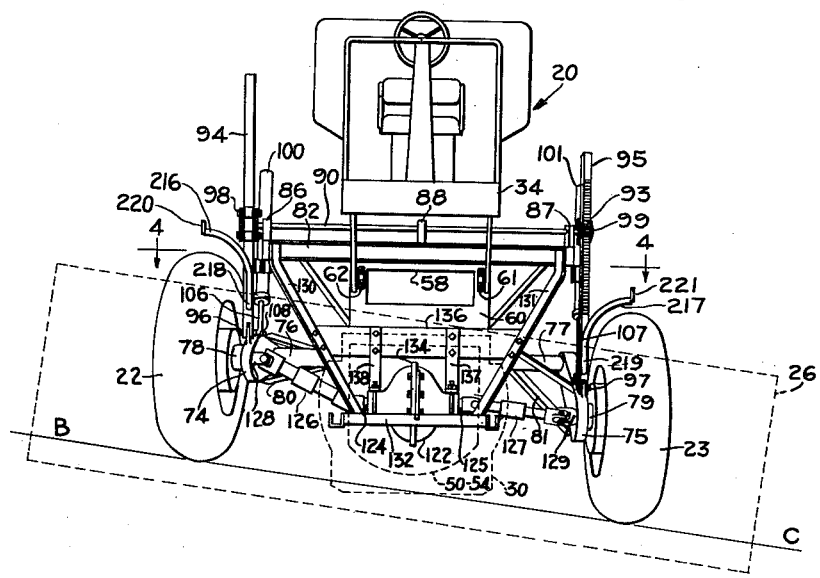
FIG. 3
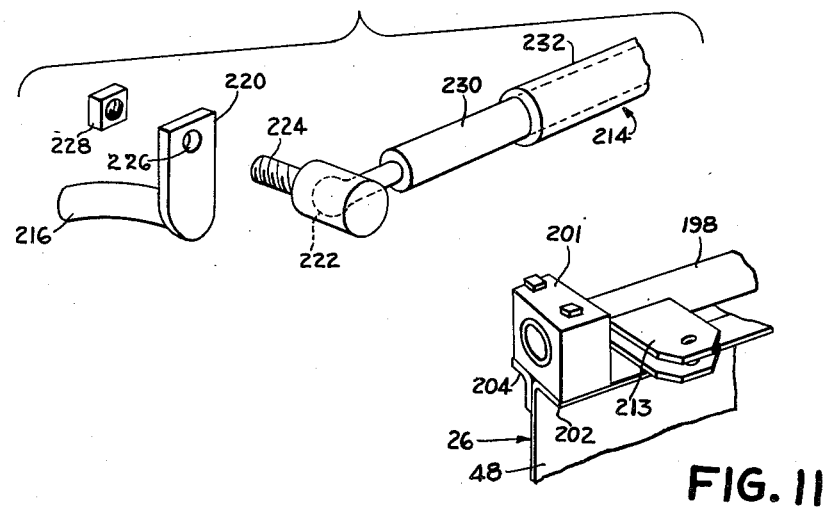
FIG. 10
FIG. 11
INVENTORS
EVERETT R. KROLL &
FRANK FARBER
BY
ATTORNEYS

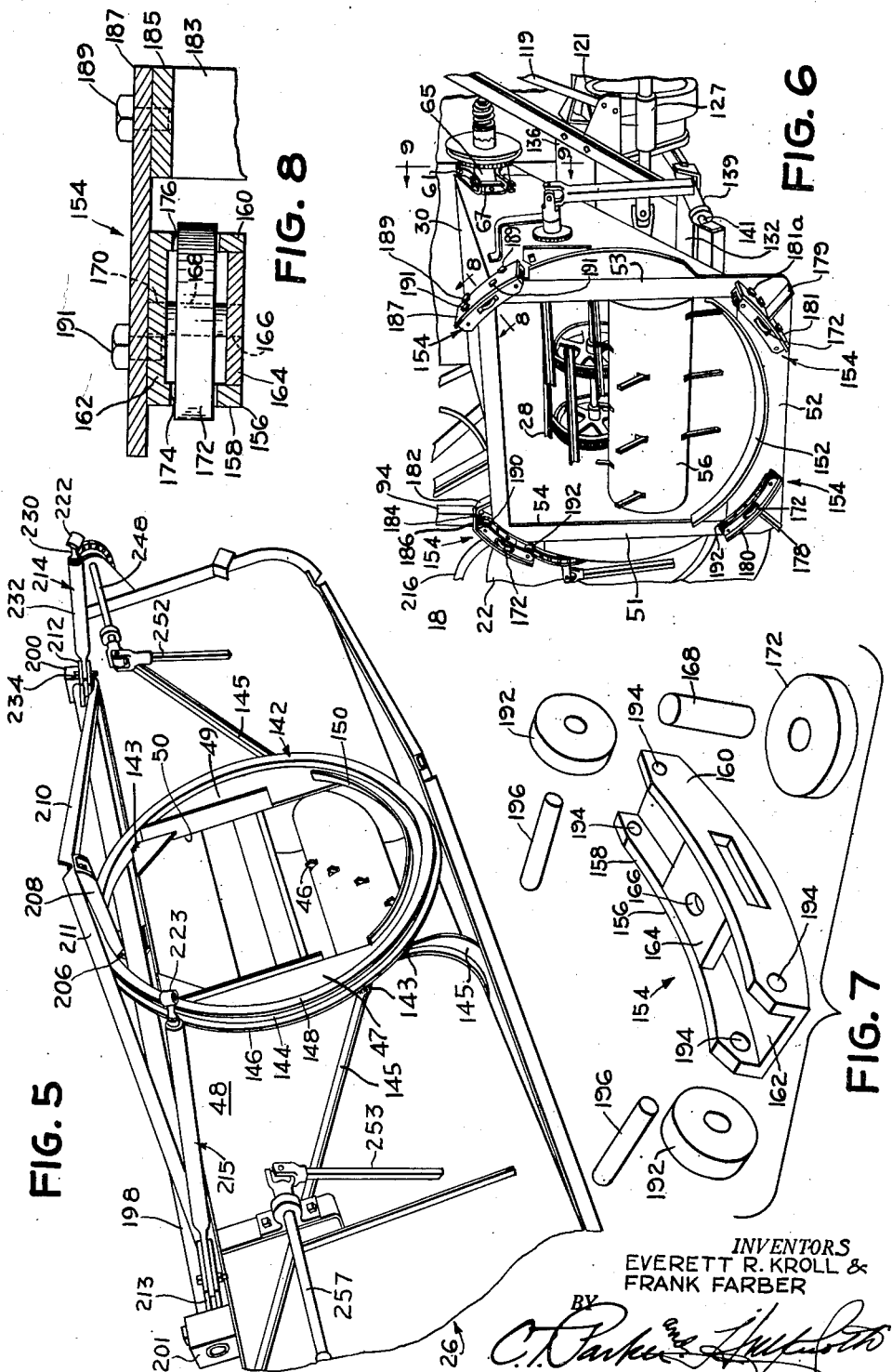

United States Patent Office 2,780,903
Patented Feb. 12, 1957

2,780,903

PLATFORM ADJUSTING MEANS FOR SIDEHILL HARVESTERS

Everett R. Kroll and Frank Farber, Moscow, Idaho, assignors to Deere & Company, Moline, Ill., a corporation of Illinois Application December 22, 1952, Serial No. 327,202

7 Claims. (Cl. 56—209)

This invention relates to a harvester and more particularly to a harvester of the type adapted to operate on hillsides.

The invention pertains primarily to improvements in harvesters of the combine or so-called harvester-thresher type in which the machine comprises a body containing threshing mechanism and carrying ahead of it a header or platform for cutting standing grain from the field. The grain is conveyed from the platform or header to the body, where it is threshed. Machines of this general nature are, of course, conventional.

In the operation of a machine of this character on hillsides or other slopes that are transverse to the line of advance, various perplexing problems arise. If the angle of the slope is not too great, it is sometimes possible to operate the machine without any modification. On slopes of increased angles, resort is sometimes had to means for evening or distributing the flow of material through the threshing mechanism, in order to avoid overloading one side of the machine. However, on slopes of relatively steep angles, more than mere even distribution of material is involved, for the stability of the machine as a whole is seriously affected and it is virtually impossible to operate a conventional combine on a hillside of any appreciable slope. It is fundamentally recognized that a modified conventional machine or a specially designed machine should have certain characteristics. First, the thresher unit or body should remain level while the wheels accommodate themselves to the slope of the field. Second, the platform or header must be connected to the body in such manner that it will likewise accommodate itself to the slope of the field. Although these desiderata are well understood, the solution of the many attendant problems has not heretofore been recognized to such an extent as to lend itself to commercial exploitation. It is therefore one of the principal objects of the present invention to provide a commercially feasible design.

Because of the relative angular movement between the header and the thresher body on account of the level position of the body and the accommodation of the header or platform to the slope, it has heretofore been difficult to maintain the proper crop-transfer relationship between the two components. That is to say, since the header moves relative to the body and since a conveyor is necessary to transfer the crops from the header to the body, special provision must be made for accommodating the conveyor regardless of the changes in position that occur between the header and body. Efforts have been made in the past to articulately interconnect the header, conveyor and body to accommodate position changes, but in these instances the conveyor was connected to the header to move with the header and therefore to move relative to the thresher unit. Accordingly, the discharge end of the conveyor would become materially displaced relative to the feed inlet opening of the body and special enclosures and additional conveyors were required. According to the present invention, the conveyor is enclosed in a feeder house, which may be of generally conventional construction, and the feeder house is connected to the body so that it assumes the same position that the body does; the header or platform is articulately connected to the front end of the feeder house for movement relative to the feeder house generally about a fore-and-aft extending axis, which means that as the header accommodates itself to the slope of the field, the feeder house and body remain level. The articulate connection involves a swivel joint that circumscribes the registered feed openings between the rear wall of the platform and the front face of the feeder house, thus enabling crop-transfer to occur within the confines of the joint. Since the axis of the joint runs fore and aft and extends through the registered openings, changes in relative angular position of the header or platform and feeder house will not affect the register of the openings.

Conventional practice in mounting the thresher body on wheels so that the body will remain level while the wheels accommodate themselves to the slope of the field involves any one of several types of individual wheel suspension means. It is preferable that a type be used in which the wheels move vertically in vertical planes, thereby increasing the stability of the machine as a whole. One type of such suspension means is used in the present case. As an additional object, these suspension means at opposite sides of the body are interconnected by stabilizer means with the header or platform so that the header or platform is compelled to move angularly relative to the body in accordance with movement of the supporting wheels. The suspension means are equalized so that as one wheel moves up the other moves simultaneously downwardly and opposite ends of the platform respectively follow the wheels.

It is another object of the invention to provide a commercially feasible design by means of which a conventional combine may be converted to a hillside combine and to that end the invention involves various subsidiary objects which, along with others, will appear from the following detailed description and accompanying sheets of drawings in which:

Figure 2 is a left-hand perspective view of the combine with the left-hand front wheel removed.

Figure 3 is a front perspective view as seen substantially along the line 3—3 of Figure 1, the dotted outline representing the header or platform on a slight slope.

Figure 4 is a fragmentary sectional view as seen substantially along the line 4—4 of Figure 3.

Figure 5 is an enlarged perspective view of the platform by itself as seen generally in the direction of the arrow bearing the encircled numeral 5 in Figure 1.

Figure 6 is a perspective view, drawn to the same scale as Figure 5, and showing the front end of the feeder house as viewed generally in the direction of the arrow bearing the encircled numeral 6 in Figure 1.

Figure 7 is an exploded view, on an enlarged scale, and showing the details of one of the bearing means for interconnecting the feeder house and platform.

Figure 8 is an enlarged sectional view as seen along the line 8—8 of Figure 6.

Figure 9 is a fragmentary sectional view as seen along the line 9—9 of Figure 6.

Figure 10 is an enlarged perspective exploded view of the structure designated by the arrow bearing the encircled numeral 10 in Figure 1.

Figure 11 is a fragmentary perspective view on an enlarged scale showing the structure designated by the arrow bearing the encircled numeral 11 in Figure 1.

Figure 1:
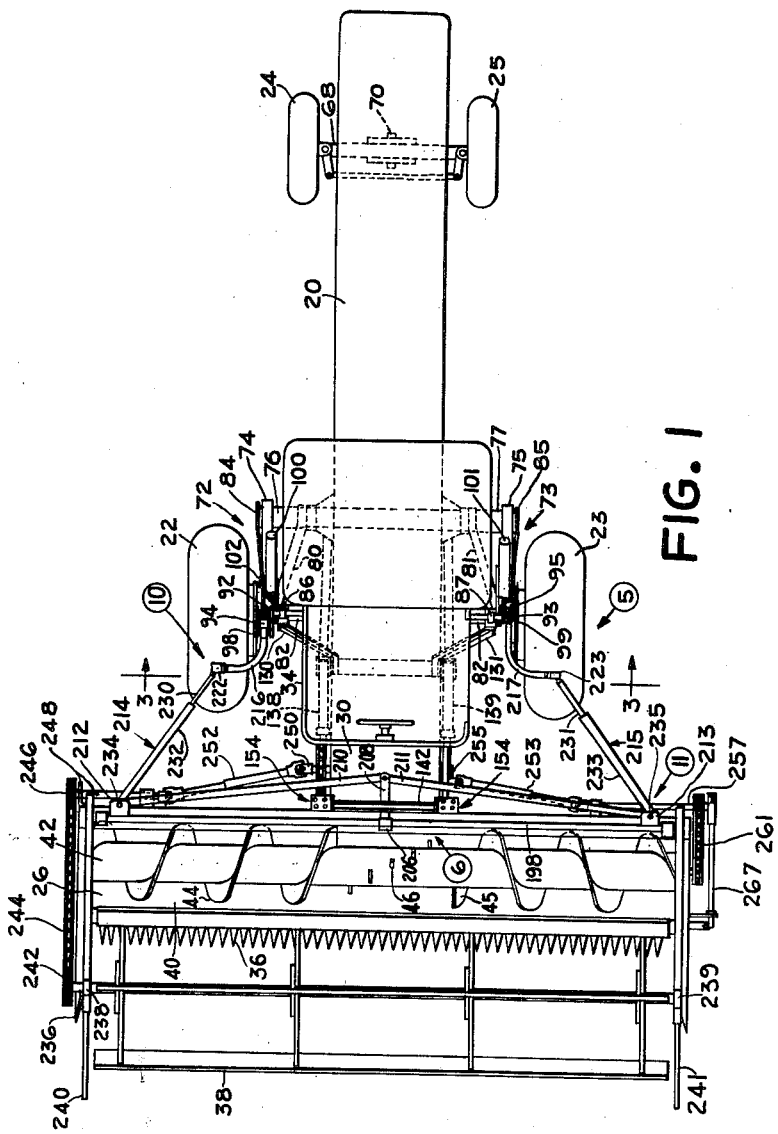
Figure 1 is a plan view of the hillside combine.

The basic combine construction chosen for the purposes of illustration is of a well known commercial type comprising a longitudinal body or thresher unit 20 carried by right- and left-hand front wheel means 22 and 23 and right- and left-hand rear wheel means 24 and 25 for advance over a field in the direction of the arrow A (Figure 2). The body 20 contains conventional threshing mechanism (not shown) and crops are cut and gathered by a header or platform or harvester unit, designated generally by the numeral 26, and conveyed from the platform to the body 20 by conveying means 28 (Figure 6) contained within a longitudinally extending feeder house 30. The combine is of the self-propelled type and includes its own internal combustion engine—illustrated only generally here and designated by the numeral 32—which provides power for driving the harvesting and threshing mechanism. The combine includes the usual operator's platform 34 on which are situated various controls for the machine. Since these are conventional and form specifically no part of the present invention, elaborate description will be eschewed.

As best appears in Figure 1, the platform 26 is disposed transversely relative to the length of the thresher body or unit 20 and has along its forward or leading edge a conventional cutter bar 36 with which a conventional reel 38 cooperates to move standing grain rearwardly onto the floor 40 of the platform. Crops on the platform are conveyed inwardly to the center by a rotatable conveyor 42 having right- and left-hand flights 44 and 45. The inner ends of the flights 44 and 45 terminate in spaced apart relationship and within this space is incorporated a finger-type beater 46 of the type shown in the U. S. patent to Oehler 2,529,180. The details of this part of the disclosure are not important here but are referred to merely for the purposes of orientation.

As best shown in Figure 5, the header or platform 26 includes an upright rear wall 48 having portions 47 and 49 that provide a rear mounting face formed with a crop-delivery means in the form of a feed opening 50 therein. It is through this opening that the finger-beater 46 discharges cut crops into the feeder house 30.

As best shown in Figure 6, the feeder house 30 has front portions 51 and 53 defining an upright front mounting face 52 in which is formed a feed opening 54. When the platform is assembled in position and mounted on the front face of the feeder house 30, the openings 50 and 54 are in register; hence, material delivered rearwardly by the finger-beater 46 passes through the registered openings 50 and 54 to be further assisted by a second finger-beater 56 for ultimate handling by the conveyor 28. The conveyor moves upwardly and rearwardly, as outlined in detail in the Oehler patent mentioned above, and delivers the crop through a front opening 58 in a front wall 60 of the thresher body or unit 20 (Figure 3).

The rear end of the feeder house is connected to the front wall 60 of the thresher unit or body 20 by means providing a pivot on a transverse horizontal axis. The left-hand one of these means is best shown in Figure 9 as comprising a bracket 61 fixed to the front wall 60 of the body 20 and bifurcated at 63 to receive a trunnion 65. A locking pin 67 passes through the furcations at 63 to hold the trunnion 65 in place. A similar mounting exists at the right-hand side of the machine, a right-hand bracket 62 being visible in Figure 3. Accordingly, although the feeder house may move vertically relative to the thresher body 20 about a horizontal axis through the pivot just described, the length of the axis is such that the feeder house moves with the body when the body is tilted or moved laterally to either side, the means for accomplishing which will be described immediately below.

The rear wheels 24 and 25 are steerable and in addition are mounted on an arched axle 68 which includes a short longitudinal pivot 70. Thus, the axle 68 can oscillate relative to the body 20 and the wheel means 24 and 25 will accommodate themselves to a slope while the body 20 remains level.

The primary control of the leveling of the body 20 is accomplished through the front wheel means 22 and 23, each of which includes an individual wheel suspension from the body. The right-hand suspension means, designated generally by the numeral 72, includes a forwardly extending arm 74 journaled at its rear end on a transverse axis via a supporting member in the form of a tube 76 rigidly affixed to the body 20 at the right-hand side thereof. The arm 74 extends forwardly and carries a stub axle 78 for journaling the right-hand wheel 22. The left-hand suspension means, designated generally by the numeral 73, is of symmetrical construction, including a longitudinally extending arm 75 pivoted to the left-hand side of the body 20 by means of a member or tube 77 and having at its front end a stub axle 79 for journaling the left-hand wheel 23. The arms 74 and 75 are respectively braced by suitable brace members 80 and 81.

A transverse supporting member 82, preferably in the form of a channel, is rigidly secured to the front wall 60 of the body 20 just below the operator's platform 34, and opposite ends of this member project respectively beyond the right- and left-hand sides of the body. These ends are appropriately braced by brace members 84 and 85 to the outer ends of the pivot members 76 and 77. The top side of the supporting member 82 is provided with a plurality of suitable bearings 86, 87 and 88 for journaling a transverse equalizer shaft 90, to the right- and left-hand ends of which are respectively keyed right- and left-hand equalizer pinions 92 and 93.

The right-hand pinion 92 is in mesh with an upright right-hand rack 94 that is pivotally connected at its lower end at 96 to a forward portion of the right-hand wheel-suspension arm 74. An appropriate guide means 98 is associated with the shaft 90 and the rack 94 to maintain engagement between the rack and the pinion. The arrangement at the left-hand side of the machine is symmetrical, although reversed; that is to say, an upright left-hand rack 95 is in constant mesh with the left-hand pinion 93 and is pivotally connected at 97 to the forward portion of the left-hand wheel suspension arm 75, being associated with the pinion by means of an appropriate guide 99, but the right-hand rack 94 is forwardly of its pinion 92, whereas the left-hand rack 95 is rearwardly of its associated pinion 93. The purpose of this arrangement is to cause one rack to move upwardly simultaneously with downward movement of the other. Accordingly, vertical movement of the wheels relative to the body is equalized and as one rises the other simultaneously falls.

The means for causing the leveling of the body by changing the vertical positions of the wheel means is here shown as comprising a pair of fluid motors 100 and 101; although, any other suitable means could be used. Since the left-hand motor 101 and its relation to its component parts is better illustrated (Figure 2) it will be described first, it being understood that the right-hand motor and its associated components are symmetrically arranged. The left-hand brace 85 between the transverse supporting member 82 and the left-hand arm-mounting member 77 includes an intermediate portion in the form of a bracket 103 provided with trunnion means 105 for carrying the motor 101 intermediate its ends. A piston rod 107 extends from the motor and is connected at 109 to a forward portion of the left-hand wheel-suspension arm 75. A symmetrically arranged right-hand mounting bracket 102 is visible in Figure 1 and the piston 106 for the right-hand motor is visible in Figure 3, as is its connection 108 to the front top portion of the right-hand wheel-suspension arm 74. The motors are simultaneously supplied with fluid, but at opposite ends, so that as one extends the other retracts. Consequently, as a downward force is exerted on one wheel-suspension arm, a lifting force will be exerted on the other. The cooperation of the equalizing means comprising the shaft 90, the pinions 92 and 93, the racks 94 and 95, etc. results in the action referred to above and accordingly as the wheels accommodate themselves to the slope of the field, the body 20 remains level—or, rather, is leveled by the means just referred to. No details have been illustrated relative to the mechanism for supplying fluid to the motors, since the specific structure by itself forms no part of the present invention and could as well be replaced by equivalent structure. Accordingly, in this respect, variations in design may be indulged only within the limits of individual desire.

Figure 3 illustrates that the body 20 is level while the wheels 22 and 23 have accommodated themselves to a slope represented by the line B—C.

The wheels 22 and 23 are drive wheels and derive power from the internal combustion engine 32. Any suitable power train may be used, such as that shown in the U. S. patent to Anderson 2,510,325. Here again, there is no rigid requirement that the specific drive be used in order to obtain the advantages of the invention. Accordingly, the disclosure here, like other parts of the disclosure, should be taken as representative and not as establishing any limits on the exploitation of the invention.

The power train comprises essentially a V-belt drive 111 taken from a pulley 113 keyed to the crankshaft 115 of the engine 32. The belt 111 is trained about a variable speed pulley 117 which incorporates a second variable speed pulley (not shown) about which is trained a second V-belt 119, the forward loop of which is trained about an input sheave 121. This sheave is keyed to a shaft (not shown) which ultimately delivers power to differential gearing (not shown) contained in a differential casing 122 below a forward central portion of the body 20. A right-hand output shaft 124 projects from the right-hand side of the differential casing and is connected by a flexible and telescopic shaft assembly 126 to a wheel shaft 128 housed in the right-hand stub axle tube 78. The flexibility and telescopic capability of the shaft assembly 126 enables the right-hand wheel 22 to move freely in opposite directions vertically without interfering with the drive to the wheel. A left-hand output shaft 125 is connected to a left-hand flexible and telescopic shaft assembly 127 which is in turn connected to a wheel shaft 129 for the left-hand wheel 23.

Figure 3 illustrates additional framework for converting the conventional combine to the hillside combine illustrated here. Right- and left-hand downwardly and inwardly converging supporting members 130 and 131 are connected at their upper ends to right- and left-hand end portions of the transverse supporting member 82 and are connected at their lower ends to a lower transverse supporting member 132. The member 132 is connected intermediate its ends by a plate 134 to the differential housing 122. An intermediate cross member 136 cross connects the members 130 and 131 and includes additional supports 137 and 138 for the differential housing 122.

Opposite ends of the lower cross member 132 provide for the mounting of right- and left-hand fluid motors 138 and 139, the free ends of the piston rods 140 and 141 of which are connected to the lower front portion of the feeder house 30. Fluid may be supplied to or exhausted from the motors 138 and 139 by any appropriate means not important here, the result of which is to adjust the platform and feeder house 30 as a unit about the pivot through the pivotal mounting 61—62. Vertical adjustment of a header or platform is not unknown and detailed description is deemed unnecessary.

The description has thus far proceeded on the assumption that the header or platform 26 is connected to the feeder house 30 for vertical adjustment with the feeder house. However, the connection between the platform and feeder house is important and a detailed description of a preferred form of connection or joint will follow.

As best shown in Figure 5, the rear wall 48 of the platform or header 26 provides a rear mounting face to which is rigidly affixed a support element or annular track means in the form of a ring member 142, the means for affixation preferably comprising welding of the ring, as at 143, to structural members 145 of the header. This member is so shaped and dimensioned as to circumscribe the feed opening 50 in the rear wall 48 of the platform. Consequently, the ring itself will not interfere with the transfer of crops through the opening 50 and into the opening 54 of the feeder house 30. The ring 142 is preferably of channel section having an annular horizontal flange 144 and front and rear adjoining upright flanges 146 and 148. In the process of converting a standard combine to a hillside combine by adapting thereto the ring or swivel joint of the present invention, it is necessary to modify the original platform by the addition thereto of the ring 142. In the standard platform, the feed opening 50 is substantially rectangular, but when the ring 142 is added, an arcuate member 150 is installed at the bottom of the opening to eliminate sharp corners in the feed opening. A cooperative arcuate member 152 is added to the normally rectangular opening 54 in the front of the feeder house 30. The length of each of the arcuate members 150 and 152 is commensurate with the expected maximum angular relationship between the header and feeder house.

The converted or modified platform or header 26 (having attached thereto the ring 142) is mounted on the front mounting face 52 of the feeder house 30 by support elements in the form of a plurality of bearing means, each designated generally by the numeral 154. The components of a bearing means are shown best in Figures 7 and 8, wherein it will be seen that there is basically involved a supporting bracket in the form of a channel 156 having upright flanges 158 and 160 and a connecting or bottom flange 162. In the case of an upper bearing means, the bottom flange 162 will, of course, be a top flange. The free ends of the upright flanges 158 and 160 are cross connected by a small rectangular plate 164 apertured at 166 to receive a mounting pin 168, the other end of the pin being received in an alined aperture 170 in the bottom (or top) flange 162 of the channel member 156. A first low-friction member or roller 172 is journaled on the pin 168 and is of such diameter as to extend through front and rear slots 174 and 176 in the channel flanges 158 and 160. The diameter of the roller or rolling element 172 is, however, less than the spacing of the front and rear flanges 146 and 148 of the platform ring 142. Thus, when the bearing means 154 are received in the annular track provided by the ring 142, they comprise first and second support elements and the rollers 172 will engage one or the other of the ring flanges 146 and 148, depending upon the direction of thrust against the platform 62. Since the normal direction of travel of the machine is forwardly, the thrust on the platform will be rearwardly and the rollers 172 will normally ride against the bearing surface provided by the rear face of the front flange 146 of the ring 142.

The bearing means 154 are mounted on the front mounting face 52 of the feeder house 30 in angularly spaced relation so as to lie on a circle that circumscribes the feeder house feed opening 54 and, as stated above, are received within the channel of the platform ring 142. Accordingly, the platform is journaled on the feeder house 30 on a fore-and-aft axis extending through the registered openings 50 and 54 and the components of the ring or swivel joint do not at all interfere with the transfer of crops through the registered feed openings 50 and 54.

The mounting of each of the lower bearing means 154 may be accomplished by welding to the lower right- and left-hand portions of the front mounting face 52 a pair of supporting brackets 178 and 179, these respectively including arcuate flanges 180 and 181. These flanges are drilled to receive a plurality of cap screws 181a which are received in suitable tapped bores in the associated bearing means 154. Of course, any other suitable mounting may be utilized.

Each of the upper corner portions of the front mounting face 52 of the feeder house 30 carries a bearing means 154, and the group of bearing means comprising the feeder-house-mounted support element includes means for the affixation thereof to the feeder house at the face 52. For this purpose, and as a part of such affixation means, the right- and left-hand upper portions of the mounting face carry supporting brackets 182 and 183. These brackets respectively have mounting flanges 184 and 185 and respectively carry mounting plates 186 and 187. As best shown in Figure 8, the mounting plate 187 is removably secured to the mounting bracket flange 185 by a plurality of cap screws 189. The plate is removably secured to its associated bearing means 154 by means of a pair of removable cap screws 191. In the original assembly of the modified header to the modified feeder house, the upper bearing means 154 are removed and the platform is positioned in such manner that the ring 152 is carried by the two lower bearing means 154. The two upper means 154 are then received in upper portions of the channel of the ring 142 and are remounted on the brackets 182 and 183 and the cap screws are replaced and tightened.

Each bearing means 154 includes a pair of additional rolling elements 192 or second low-friction members, the upright flanges 158 and 160 being apertured in alinement at 194 to receive shafts or pins 196 for mounting the rollers 192. The diameter of each of these rollers is such that portions of the rollers extend beyond the flanges 158 and 160 so as to ride on the bearing surface provided by peripheral portions of the horizontal ring flange 144. The nature of the plurality of bearing means 154, together with the header ring 142, is such as to provide a low-friction joint or journal means between the platform 26 and feeder house 30. Since the feeder house 30 is connected to the thresher unit or body 20 for leveling with the body, the platform 26, by means of the ring joint 142—154, is mounted for angular movement relative to the body 20. Thus, as the body is leveled, the header or platform 26 will accommodate itself to the slope and will lie parallel to the slope. Stated otherwise, the header 26 will assume a position parallel to a line drawn through the centers of the wheels 22 and 23, since both the wheels and the header accommodate themselves to the slope of the field while the body 20 remains level.

Another feature of the invention is the stabilizing or controlling of the platform or header relative to the wheels 22 and 23. This stabilizer operates to compel the platform or header to assume the same angle as the wheels 22 and 23 relative to the thresher unit 20 and feeder house 30.

The stabilizer comprises an elongated torsion member or bar 198 rigidly fixed as by welding at its opposite ends to right- and left-hand mounting blocks 200 and 201. These blocks are rigidly affixed to the upper edge portion of the platform back wall 48, which upper edge is flanged to the rear at 202 and carries an angle member 204 along the front portion thereof (Figure 11). The torsion bar is further affixed intermediate its ends to the upper edge of the platform or header 26 by means of a rigid bracket 206 which includes a rearward extension 208 to which are connected the proximate ends of right- and left-hand braces 210 and 211. The outer or forward ends of the braces are connected respectively to rearwardly extending right- and left-hand ears 212 and 213 rigidly affixed, as by welding, to right- and left-hand end portions of the torsion bar 198. The torsion bar 198 and its rearwardly extending ears 212 and 213 thus form a rigid U-shaped element that is rigidly secured to the top of the platform rear wall 48. The torsion bar 198 not only adds strength to the platform itself but comprises an important part of the stabilizer. Right- and left-hand stabilizer means or force-transmitting elements 214 and 215 extend rearwardly from the ears 212 and 213 for connection to platform-control members in the form of standards 216 and 217 associated respectively with the right- and left-hand suspension arms 74 and 75. In the preferred embodiment of the invention illustrated here, the right-hand control member 216 is welded at its lower end at 218 to the right-hand rack 94 and curves upwardly and outwardly to dispose its upper end 220 just above the right-hand wheel 22. For all practical purposes, the member 216 could be mounted directly on the arm 74 or could be otherwise mounted in any manner so that it would derive force from the rise and fall of the arm 74. The left-hand control member is symmetrically arranged relative to the left-hand suspension means, being secured at its lower end as by welding at 219 to the left-hand rack 95 and curving upwardly and outwardly to an upper mounting portion 221 just above the left-hand wheel 23.

As shown in detail in Figure 10, the rear end of the right-hand stabilizer element 214 is connected to the right-hand platform-control member 216 by means including a ball and socket connection 222, which connection includes a threaded shank 224 that passes through an aperture 226 in the control member mounting portion 220 to receive a securing nut 228. The stabilizer element 214 comprises a pair of relatively extensible and contractible members 230 and 232, the former of which is connected to the ball and socket connection 222 and the latter of which is pivotally connected on a vertical axis by a bolt 234 to the right-hand torsion bar ears 212.

The arrangement at the left-hand side of the machine is symmetrical as respects that just described. The rear end of the left-hand stabilizer element 215 has a ball and socket connection 223 with the upper mounting portion 221 of the left-hand platform-control member 217. The left-hand stabilizer comprises a pair of relatively extensible and contractible members 231 and 233, the forward one of which is pivotally connected by a bolt 235 on a vertical axis to the left-hand torsion bar ears 213.

Although the pivots at 234 and 235 between the ears 212 and 213 and the stabilizers 214 and 215 provide somewhat of an articulate connection between the stabilizers and the torsion bar 198, it will be observed that the stabilizers are substantially rigid against deflection out of a horizontal plane relative to the torsion bar 198. Consequently, the stabilizers may be considered extensions of the legs of the rigid U previously described as being made up of the torsion bar 198 and its rearwardly extending ears 212 and 213. Although the stabilizers are extensible and contractible, as described, the members do have inherent rigidity and, by virtue of their connection to the suspension means via the platform-control members 216 and 217, transmit forces from the vertically moving wheels 32 and 33 to the platform 26 so that the platform is compelled to assume the same angle as the wheels. Since the platform is pivoted to the thresher body and feeder house on a fore-and-aft axis through the swivel joint 152—154, the outer ends of the platform will move in arcs lying in a transverse upright plane. But the suspension means are mounted on the thresher body 20 on a transverse pivot axis 76—77. Thus, the arms 74 and 75 swing in longitudinal vertical planes. Accordingly, the two axes just referred to are angularly related at 90°, which means that there will be a change of length between the points 222 and 234 on the right side and between 223 and 235 on the left side. Therefore, the stabilizer elements 214 and 215 are made extensible and contractible as described to compensate for these changes in length.

In the conversion or adaptation of a standard model combine to a hillside model, very little modification of the driving mechanism is required, with the exception of utilizing flexible shafting to accommodate relative movement between the platform and the feeder house. For example, the reel 38 is conventionally mounted on a transverse shaft 236 supported in bearings 238, 239 on right- and left-hand reel supports 240 and 241, as is conventional. The reel shaft 236 projects beyond the right-hand reel support 240 to carry a sprocket 242 and a driving chain 244 is trained about this sprocket and about an input sprocket 246 keyed to a short shaft 248 journaled at a rear portion of the platform 26. Conventionally, the shaft 248 would be connected directly to an upper shaft 250 in the feeder house 30. But, in view of the articulate connection 142—154 between the platform and feeder house, the conventional shafting is replaced by a telescopic and flexible shaft assembly 252.

The same is true at the opposite side of the feeder house 30, wherein a flexible and telescopic shaft assembly 253 replaces the conventional shaft to transmit power from a feeder house shaft 255 to a platform drive shaft 257. This latter shaft has keyed thereto a driving sprocket 259 which transmits power through a chain 261 to a sprocket 263 on a shaft 265 that is connected to the auger feeder 42.

The shaft 257 also provides means 267 for driving the cutter bar for the sickle 36, the details of which form no part of the present contribution, being covered in the U. S. patent to Paradise 2,297,317.

The remainder of the drive is generally conventional and needs no elaboration.

The general operation of the machine follows that of the conventional combine, with the exception of accommodating the machine to the slope of the hillside. The machine is driven to the field and it will be assumed that the entire field is of a sloping nature. The hydraulic motors 100 and 101 are operated to level the body 20 and feeder 30. The wheels 22 and 23 have already accommodated themselves to the slope and, because of the stabilizer means 214—198—215, the header is compelled to accommodate itself to the slope, the header moving angularly, of course, relative to the feeder house and thresher body about the fore-and-aft axis through the swivel or ring joint 142—154. Whenever changes in the angle of the slope are encountered, the operator makes the necessary leveling adjustment by means of the motors 100 and 101. Height of cut is adjusted by the motors 138 and 139.

The conversion of a standard combine to a hillside combine is, of course, made relatively easy by adapting the design illustrated here. Of course, a hillside combine may be specifically designed for that purpose by utilizing the principles of the invention. In this respect, there are two phases to the invention, each of which is equally important in the development of a commercially acceptable machine. Various other features of the invention not specifically enumerated herein will undoubtedly occur to those versed in the art, as likewise will many modifications and alterations in the preferred construction illustrated, all of which may be achieved without departing from the spirit and scope of the invention.

What is claimed is:

1. A hillside harvester, comprising: a longitudinal body; first and second wheel means respectively at opposite sides of the body to carry the body for advance over a field that slopes transverse to the line of advance; first and second suspension means respectively connecting the first and second wheel means to the body and providing for vertical movement of the wheel means relative to the body and relative to each other in accordance with changes in field contour; equalizing means cross-connecting the suspension means for effecting simultaneous vertical movement of the first and second wheel means in opposite directions for accommodating the wheel means to the slope while the body remains level; first and second platform-control members transversely spaced apart on the order of and connected respectively to the first and second suspension means and movable vertically respectively in accordance with the first and second wheel means; a harvester platform positioned transversely of and ahead of the body and wheel means; journal means interconnecting the body and the platform for relative angular movement generally about a fore-and-aft journaling axis so that the platform parallels the slope while the body remains level; and first and second fore-and-aft stabilizer means spaced apart transversely and having front ends connected to the platform at opposite sides of the journaling axis, both stabilizer means extending rearwardly toward and having rear ends connected respectively to the first and second platform-control members for causing the platform to move angularly relative to the body in accord with vertical movement of the first and second wheel means.

2. A hillside harvester, comprising: a longitudinal body; first and second wheel means respectively at opposite sides of the body to carry the body for advance over a field that slopes transverse to the line of advance; suspension means supporting the body on the wheel means and providing for upward movement of one wheel means relative to the body and simultaneous downward movement of the other wheel means relative to the body so that the wheel means accommodate themselves to the slope while the body remains level; a harvester platform transverse to and ahead of the body; means interconnecting the body and the platform for relative angular movement so that the platform parallels the slope while the body remains level; at least one platform-control member movable at one side of the body and deriving force from one of the wheel means to move respectively in accordance with vertical movements of said one wheel means; and fore-and-aft extending mechanical force-transmitting means having a rear portion thereof connected to the platform-control member and having a front portion thereof connected to the platform for compelling angular movement of the platform relative to the body in accord with vertical movements of said one wheel means.

3. A hillside harvester, comprising: a longitudinal body; first and second wheel means respectively at opposite sides of the body to carry the body for advance over a field that slopes transverse to the line of advance; suspension means supporting the body on the wheel means and providing for upward movement of one wheel means relative to the body and simultaneous downward movement of the other wheel means relative to the body so that the wheel means accommodate themselves to the slope while the body remains level; a harvester platform transverse to and ahead of the body; means interconnecting the body and the platform for relative angular movement so that the platform parallels the slope while the body remains level; first and second platform-control members respectively at opposite sides of the body and deriving force respectively from the first and second wheel means to move respectively in accordance with vertical movements of said first and second wheel means; a transverse torsion member lying closely adjacent and fixed to the platform and having first and second opposite end portions; and first and second force-transmitting elements respectively interconnecting the first and second platform-control members and the first and second end portions of the torsion member.

4. A hillside harvester, comprising: a longitudinal body; first and second wheel means respectively at opposite sides of the body to carry the body for advance over a field that slopes transverse to the line of advance; first and second suspension arms, each pivoted to the body on a transverse axis, for vertical movement relative to the body and relative to each other; means rotatably mounting the first and second wheel means respectively in the first and second arms; equalizer means interconnecting the arms and providing for simultaneous vertical movement of the arms in opposite directions so that the wheel means may accommodate themselves to the slope while the body remains level; first and second platform-control members fixed respectively to the first and second arms; a harvester platform transverse to and ahead of the body and wheel means; journal means interconnecting the body and the platform for relative angular movement generally about a fore-and-aft axis so that the platform parallels the slope while the body remains level; and first and second longitudinally extending stabilizer elements articulately connected resspectively to the first and second platform-control members and rigidly connected to the platform in transversely spaced apart relation, each element including a pair of relatively longitudinally extensible and contractible members to compensate for changes in longitudinal distance between the arms and the platform because of the angular relation of the arm and platform pivot axes.

5. In a hillside-type harvester including a body, a harvester platform and means for keeping the body level while the platform accommodates hillside slopes, said body having a fore-and-aft relatively narrow feeder house element arranged to occupy the level of the body and formed with a forwardly facing feed opening, and said platform being relatively wide and lying ahead of and transversely across the feeder house opening and having a forward crop-receiving portion, a rear generally upright wall element provided with an opening in register with the feed opening, and conveying means on said forward portion for moving platform-received crops transversely toward the registered openings, the improvement comprising: swivel joint means interconnecting the feeder house and the platform rear wall elements for slope-accommodating angular movement of the platform relative to the feeder house element about a fore-and-aft axis through the registered openings, said means including arcuate track means on one element and concentric with said axis and bearing means on the other element and engaging the track means, said track means lying generally in a plane radial to said axis and at the junction of said registered openings; a fore-and-aft conveyor within and occupying the level of the feeder house to receive crops from the platform conveyor; and a crop-transfer device additional to the conveyors and carried exclusively by the feeder house so as to remain level with the feeder house irrespective of angular movement of the platform, said device being operative to facilitate transfer of crops from the platform conveyor to the feeder house conveyor via said registered openings.

6. In a hillside-type harvester including a body, a harvester platform and means for keeping the body level while the platform accommodates hillside slopes, said body having a fore-and-aft relatively narrow feeder house arranged to occupy the level of the body and formed with a generally upright transverse front mounting face element provided with a feed opening, and said platform being relatively wide and lying ahead of and transversely across the feeder house opening and having a forward crop-receiving portion, a rear generally upright mounting face element in face-to-face relation to the feeder house mounting face and provided with an opening in register with the feed opening, and conveying means on said forward portion for moving platform-received crops transversely toward the registered openings, the improvement comprising: swivel joint means interconnecting the feeder house and platform mounting face elements for slope-accommodating angular movement of the platform relative to the feeder house about a fore-and-aft axis through the registered openings, said means including arcuate track means on one element and concentric with said axis and bearing means on the other element and engaging the track means, said track means and bearings lying generally at the junction of said faces registered openings; a fore-and-aft conveyor within and occupying the level of the feeder house to receive crops from the platform conveyor; and a rotary crop-transfer device additional to the conveyors and carried exclusively by the feeder house on a transverse axis behind the feeder house mounting face element so as to remain level with the feeder house irrespective of angular movement of the platform, said device being operative to facilitate transfer of crops from the platform conveyor to the feeder house conveyor via said registered openings.

7. In a hillside combine including a thresher unit adapted to operate in a level position on a hillside and having a longitudinally extending feeder house provided with portions defining a forwardly facing crop-inlet opening, and a harvester unit adjacent to the thresher unit and adapted to operate parallel to the slope of the side hill and having crop-delivery means including portions adjacent to the feeder house portions and defining a rearwardly facing crop-outlet opening in register with the crop-inlet opening, the improvement comprising: first and second support elements interjournaled for relative angular movement and positioned at the junction of the feeder house and harvester unit portions in juxtaposition to the registering openings with the journaling axis extending longitudinally through said openings and within the confines of the opening-defining portions; first and second means respectively on the support elements for affixing the elements respectively to the feeder house and to the harvester unit so that the aforesaid articulation between the feeder house and the harvester unit occurs about the journaling axis to retain registry of the openings; said support elements being so shaped and dimensioned relative to each other and to the openings as to be traversed by crops moving from the harvester unit to the feeder house via the registered openings; and crop-feeding means mounted rearwardly of said junction and including portions projecting into the registered openings for expediting the movement of material from the harvester unit to the feeder house via said openings.

References Cited in the file of this patent

UNITED STATES PATENTS

| Number | Name | Date |
|---|---|---|
| 1,886,069 | Wandscheer | Nov. 1, 1932 |
| 1,972,407 | Morse | Sept. 4, 1934 |
| 2,320,283 | Knowlton et al. | May 25, 1943 |
| 2,488,592 | Hamilton et al. | Nov. 22, 1949 |
| 2,504,289 | Waterman | Apr. 18, 1950 |
| 2,513,111 | Schiller | June 27, 1950 |
| 2,629,218 | Smith | Feb. 24, 1953 |
| 2,654,207 | Long | Oct. 6, 1953 |
| 2,656,668 | Witzel | Oct. 27, 1953 |